United States Patent [19]

Koch

[11] 4,433,290

[45] Feb. 21, 1984

[54] MAGNETIC COATING THICKNESS COMPARATOR HAVING PARALLEL MAGNETIC RODS WITH NONMAGNETIC SLIDE INDICATORS

[75] Inventor: Frank Koch, Ogdensburg, N.Y.

[73] Assignee: DeFelsko Corporation, Ogdensburg, N.Y.

[21] Appl. No.: 514,766

[22] PCT Filed: Nov. 12, 1982

[86] PCT No.: PCT/US82/01602

§ 371 Date: Jul. 7, 1983

§ 102(e) Date: Jul. 7, 1983

[87] PCT Pub. No.: WO83/01833

PCT Pub. Date: May 26, 1983

Related U.S. Application Data

[63] Continuation-in-part of Ser. No. 320,508, Nov. 12, 1981, abandoned.

[51] Int. Cl.³ .................. G01B 7/10; G01R 33/12
[52] U.S. Cl. .................................. 324/230; 33/169 F
[58] Field of Search ............... 324/207, 228, 229-231, 324/200; 33/169 F

[56] References Cited

U.S. PATENT DOCUMENTS

| | | | |
|---|---|---|---|
| 2,469,476 | 5/1949 | Sellers | 324/230 |
| 2,507,529 | 5/1950 | Lipson | 324/230 |
| 2,625,585 | 1/1953 | Krouse | 324/230 X |
| 2,749,505 | 6/1956 | McNary | 324/230 |
| 2,903,645 | 9/1959 | Wright | 324/230 |
| 3,521,160 | 7/1970 | Nix | 324/230 |
| 3,699,487 | 10/1972 | Steingroever | 324/230 X |
| 3,761,804 | 9/1973 | Steingroever | 324/230 |

FOREIGN PATENT DOCUMENTS 575150 2/1946 United Kingdom.
1436559 5/1976 United Kingdom.

Primary Examiner—Gerard R. Strecker
Attorney, Agent, or Firm—Burns, Doane, Swecker & Mathis

[57] ABSTRACT

A coating thickness and surface comparator for measuring the thickness of nonmagnetic coatings (28) or roughness on ferromagnetic base materials. A permanent rod magnet (6) and a ferromagnetic rod (16) are supported by nonmagnetic slides (12, 14) parallel to one another. When a standard base (24) is placed at one end (22) of the rod magnet (6) and a coated or roughened base (30) is placed at the other end, the slides (12, 14) are pushed together toward the middle of the rod magnet (6). The coincidence of the slides (12, 14) varies from the middle of the bar magnet (6) in proportion to coating thickness (28) or roughness.

21 Claims, 3 Drawing Figures

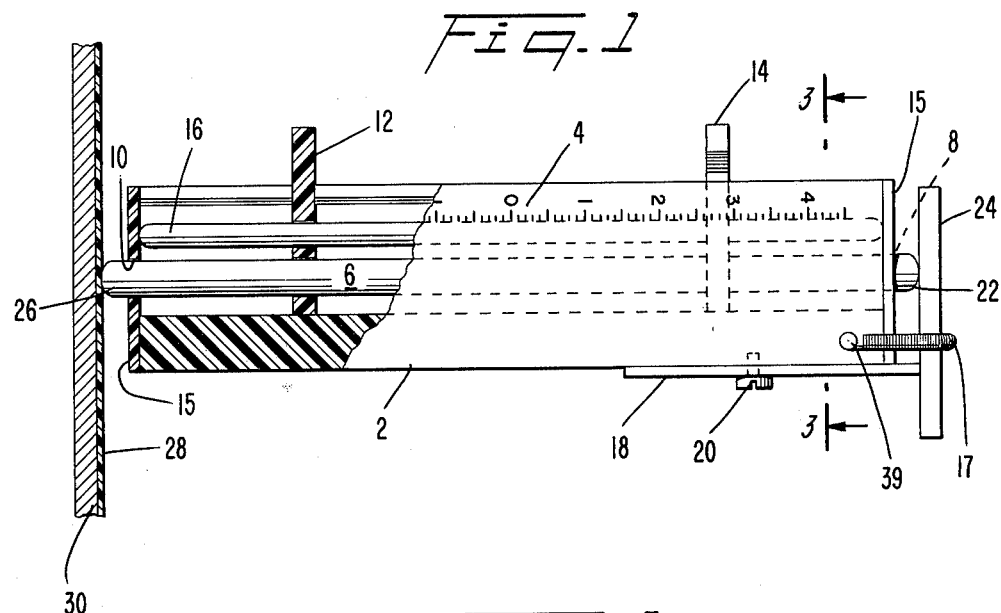
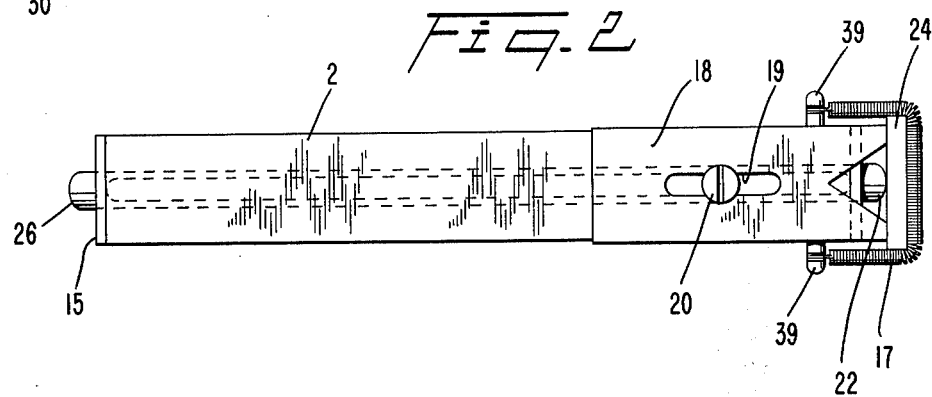
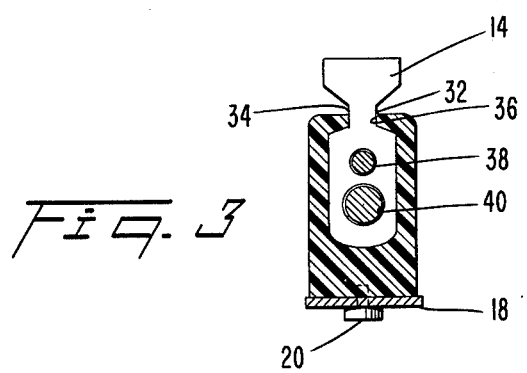

MAGNETIC COATING THICKNESS COMPARATOR HAVING PARALLEL MAGNETIC RODS WITH NONMAGNETIC SLIDE INDICATORS

This is a continuation-in-part of application Ser. No. 320,508, filed Nov. 12, 1981, now abandoned.

TECHNICAL FIELD

The field of the invention is electricity, measuring and testing wherein a layer or layered material thickness is measured using a magnetic field to test the material. The present invention is particularly concerned with the measurement of the thickness of nonmagnetic coatings or layers on magnetic base materials.

BACKGROUND ART

The state of the art of measuring the thickness of nonmagnetic coatings on a magnetic base using a magnetic field may be ascertained by reference to U.S. Pat. Nos. 2,469,476; 2,625,585; 2,903,645; 3,521,160 and 3,699,487, the disclosures of which are incorporated herein by reference.

U.S. Pat. No. 2,469,476 of Sellers discloses an instrument for measuring the thickness of nonmagnetic coatings on a ferrous base and the patent also discloses that it is possible to use the instrument for measuring the irregularities in the surface of a machined ferrous material. According to this patent an adjustable bar magnet bridge is pivoted between the legs of a U-shaped magnet. The limbs of the U-shaped magnet are placed on the surface to be measured. The pivoted bar magnet has an indicator attached thereto and is spring biased so that changes in the magnetic flux of the U-shaped magnet indicate the layer thickness or roughness.

The magnetic measuring gauge disclosed in U.S. Pat. No. 2,625,585 makes use of the principle that forces necessary to disengage a magnet from a workpiece vary in inverse proportion to the thickness of the nonmagnetic plating or coating disposed upon the magnetic base surface. U.S. Pat. No. 2,903,645 makes use of this same principle but in a more complex instrument.

U.S. Pat. No. 3,521,160 is representative of a series of patents of Nix et al which show magnetic thickness gauges using a magnet mounted on the end of a balanced rotatable arm to which a dial is coupled over a spring. The dial is turned until the increasing tension of the spring breaks the magnetic contact and the thickness is read directly from the dial.

Steingroever discloses in U.S. Pat. No. 3,699,487 magnets of anisotropic materials for use in the magnetic thickness gauges.

According to these magnetic thickness gauges of the prior art, the magnet is placed on a coated steel surface and pulled off by a spring. The force required to pull the spring off of the surface is indicated on a scale and expressed in coating thickness. The spring force and the magnetic force are of an uncomplimentary or non-linear nature and produce a logarithmic scale. As time goes on, the magnet either loses or gains magnetism and the spring is subject to fatigue and temperature variations. To obtain a fair degree of accuracy, each prior art gauge has to be individually calibrated and requires an elaborate set-up which is very time consuming. These so-called "pull-off gauges" are calibrated to a mild steel plate. As soon as the coated steel surface is of a rough nature or the substrate is of a different steel than that to which the gauge is calibrated, the readings of these gauges become relative.

OBJECTS AND BRIEF DISCLOSURE OF INVENTION

Having in mind the limitations of the prior art, it is an object of the present invention to provide a coating thickness and surface roughness comparator which avoids the uncomplimentary or non-linear reaction between magnetic force and spring force.

This object is accomplished in the present invention by using the principle of magnetic force versus friction.

In a particular embodiment of the comparator of the present invention, the comparator has the following elements:

(a) a permanent rod magnet or a rod having equal magnets at each end;

(b) a ferromagnetic rod approximately parallel to the permanent rod magnet or the rod having equal magnets at each end;

(c) nonmagnetic slides or spacers preventing contact between the rod magnet and the ferromagnetic rod; and (d) an indicator of the middle of the rod magnet.

The comparator is used for making measurements by placing a first or reference pole of the rod magnet in contact with a reference ferromagnetic base material. The second or measuring pole of the rod magnet is placed in contact with the coated or roughened ferromagnetic surface to be measured. Both slides or spacers are moved to the extremities of the measuring and reference poles, respectively, and then moved together by hand or other means. An indication of the center or middle position of the rod magnet is provided and deviations from this center point by the coincidence of the slides is an indication of the thickness and/or roughness of the surface being measured.

DESCRIPTION OF THE DRAWINGS

The invention is further explained by reference to the accompanying drawings showing the preferred embodiment of the present invention, wherein:

FIG. 1 is a side view in partial cross-section of the coating thickness and surface roughness comparator of the present invention as used with a reference surface and a coated surface;

FIG. 2 is a bottom plan view of FIG. 1; and

FIG. 3 is a cross-sectional view of FIG. 1 along the line III—III.

DETAILED DESCRIPTION OF THE BEST MODE FOR CARRYING OUT THE INVENTION AND OF THE PREFERRED EMBODIMENT

With particular reference to FIG. 1, the comparator is shown having a housing or casing 2 with a scale 4 thereon. The scale 4 is calibrated with a plus scale on one side of the center or middle of the permanent rod magnet 6 and a minus scale on the other side of the middle of the rod magnet.

The rod magnet 6 is supported in holes 8,10 at the ends of the housing. The housing 2 is composed of a nonmagnetic material and the holes 8,10 can hold the rod magnet 6 securely by friction so that the middle of the rod magnet is in register with the zero indication of the scale 4.

Nonmagnetic slides or spacers 12, 14 support a ferromagnetic rod 16 substantially parallel to the rod 6. The ferromagnetic rod 16 is preferably a cold rolled steel rod. The ends 15 of the housing 2 prevent a horizontal movement of the ferromagnetic rod 16.

An adjustable spacer 18 is releasably fixed to the housing 2 by a screw 20. An uncoated steel plate 24 is positioned adjacent a reference pole 22 (one end of the rod 6) and a measuring pole 26 (the other end of the rod 6) is placed against a coating 28 on a steel plate 30. The spacer 18 is provided with a V-notch on one end and is adjustable so as to accommodate a rod (not shown) rather than the plate 24 if desired. During operation of the device (either calibration or normal use) the uncoated steel plate 24 (or a rod) is releasably fixed at the end of the device by an elastic member or spring 17. The spring 17 passes over two arms 39 which extend from either side of the housing 2. The arms 39 are provided with grooves so as to securely receive the ends of the spring 17. In this way, the plate 24 is releasably urged against the end of the rod magnet 6 and the end of the adjustable spacer 18.

The nonmagnetic materials: the housing 2, the spacers 12 and 14, the adjustable spacer 18 and the screw 20, are suitably made of unplasticized plastics such as Nylon 6—6 or copper base metals such as brass.

In FIG. 2, the adjustable spacer 18 is shown with an adjustment slot 19 so as to permit the spacer 18 to be moved relative to the housing when the plate 24 is replaced by a rod (not shown).

The slider 14 is shown in FIG. 3 with two notches 32, 34 engaging a longitudinal opening 36 of the housing 2 and also supporting the rods 16 and 6 in the holes 38 and 40, respectively.

A method of using the present invention is discussed with reference to FIG. 1. To measure the thickness of the nonmagnetic coating 28 on the base 30, the measuring pole 26 is placed adjacent to the coating. The measuring pole 26 is preferably arranged perpendicularly relative to the coating to be measured. Likewise, the reference pole 22 is preferably arranged perpendicular to the standard plate 24. Both the base 30 and the standard plate 24 are preferably of the same ferromagnetic material, namely steel, and preferably are of the same thickness or roughness.

If desired, the base 30 (and the coating to be measured) may also be arranged either horizontally or vertically with the measuring pole 26 arranged at an angle of 45° relative to the base 30. In this way, any effect of gravity on the accuracy of the device is minimized by maintaining the device at an angle of 45° to the horizon.

If the device is to be oriented at an angle of 45° with respect to the coating to be measured, the rod 6 preferably extends sufficiently beyond the ends of the housing so that the device may be readily oriented at the angle of 45° with the end of the rod 6 in contact with the coating to be measured.

Whether the device is horizontal, vertical or at an angle of 45°, the sliders 12 and 14 are each moved outwardly toward the measuring pole 26 and the reference pole 22, respectively, and the sliders are then pushed together (i.e., toward one another) until they coincide.

Due to the coating 28, the measuring pole is not attracted to the base 30 to the same extent as the reference pole 22 is attracted to the standard plate 24. This magnetic attraction of the pole 26 to the base 30 varies inversely according to the thickness of the coating 28 and as a result of the reduced magnetic attraction, the rod 16 is attracted more strongly at the measuring pole 26.

As a result of this increased magnetic attraction between the measuring pole 26 and the rod 16, more force is applied to the slider 12 so that when the slider 12 is moved to the right to coincide with the silder 14, increased friction is applied. As a result of the increased friction between the slider 12 and the rods 6 and 16, the slider 12 drags and will be positioned to the left of the zero reading of the scale 4 when the two sliders 12, 14 meet. The reading on the scale 4 is an indication of the thickness of the coating 28.

The device according to the present invention may also be operated in other manners. For example, the standard plate 24 may be replaced by a standard plate having a known coating thickness and as a result thicker coatings can be measured at the measuring pole 26 without exceeding the range of the scale 4.

In yet another method of operation, the reference pole 22 is first placed preferably at an angle of 45° to the horizon and contacts a standard plate (not shown) which is arranged either horizontally or vertically. There is no plate provided at the measuring pole 26.

Again the sliders 12 and 14 are moved to the measuring pole 26 and to the reference pole 22, respectively, and they are then pushed together until they coincide and a first reading to the left of zero on scale 4 is recorded.

Now the reference pole 22 is placed adjacent to and preferably at an angle of 45° with respect to the base 30 having a nonmagnetic coating 28 and again there is no plate at the measuring pole 26.

The sliders 12 and 14 are moved to the measuring pole 26 and to the reference pole 22, respectively, and they are then pushed together until they coincide and a second reading to the left of zero on the scale 4 is recorded.

The difference between the first reading recorded and the second reading is representative of the thickness of the coating 28.

The principles, preferred embodiments and modes of operation of the present invention have been described in the foregoing specification. The invention which is intended to be protected herein should not be construed as limited to the particular forms disclosed, since these are to be regarded as illustrative rather than restrictive. Variations and changes may be made by those skilled in the art without departing from the spirit of the present invention.

What is claimed is:

1. A coating thickness comparator comprising:
   (a) a permanent rod magnet having a middle, a reference pole and a measuring pole;
   (b) a ferromagnetic rod arranged parallel to said permanent rod magnet;
   (c) first and second nonmagnetic slides supporting said permanent rod magnet and said ferromagnetic rod and maintaining said rods substantially parallel to one another said slides being arranged for longitudinal movement along said rods;
   (d) a housing including means for indicating said middle of said permanent rod magnet; and
   (e) a standard ferromagnetic base abutting said reference pole, and a ferromagnetic base having a coating thereon abutting said measuring pole;
   a position of said nonmagnetic slides when pushed together to coincide indicating a thickness of said coating.

2. The thickness comparator of claim 1, wherein said housing is nonmagnetic and said slides are suspended in the housing and said indicating means includes a scale on said housing parallel to said rods.

3. The thickness comparator of claim 2, further comprising an adjustable spacer on said housing releasably mounted adjacent said reference pole.

4. The thickness comparator of claim 3, wherein said housing, slides, and adjustable spacer are made of plastic.

5. The thickness comparator of claim 1, wherein both of said poles extend beyond the ends of said housing.

6. The thickness comparator of claim 1 further comprising a reference plate releasably mounted adjacent said reference pole.

7. The thickness comparator of claim 1 wherein said one of said poles extends sufficiently beyond said one end of said housing whereby said thickness comparator may be oriented at 45° to said coating thickness to be measured.

8. A coating thickness comparator for measuring a coating thickness, comprising:
   a first rod having magnetic poles at either end;
   a second rod arranged substantially parallel to said first rod, said second rod being magnetically attracted to said poles of said first rod;
   means for supporting said second rod with respect to said first rod, said means for supporting including first and second unmagnetizable slides arranged for longitudinal movement along said first and second rods;
   a housing including means for indicating a mid-point of said first rod, at least one of said poles of said first rod extending beyond said housing, said housing including indicating means for measuring a distance of said first and second slides relative to the mid-point of said first rod.

9. The coating thickness comparator of claim 8 wherein each of said slides includes first and second openings, said first rod being slidably received within the first opening of each of said slides and said second rod being slidably received within the second opening of each of said slides, a frictional force between one of said slides and the first and second rods corresponding to the coating thickness to be measured when said coating thickness is adjacent to one of the magnetic poles of the first rod.

10. The coating thickness comparator of claim 9 wherein said housing is unmagnetizable and wherein said indicating means includes a scale provided on said housing parallel to said first and second rods.

11. The coating thickness comparator of claim 10 wherein a mid-point of said second rod is aligned with a mid-point of said scale.

12. The coating thickness comparator of claim 8 wherein said first rod comprises a permanent rod magnet and said second rod comprises a rod of ferromagnetic material.

13. The coating thickness comparator of claim 12 wherein a mid-point of said second rod is aligned with a mid-point of the first rod.

14. The coating thickness comparator of claim 8 further comprising an adjustable spacer on said housing releasably mounted adjacent said reference pole of the first rod.

15. The coating thickness comparator of claim 14 wherein the housing is of plastic material and wherein the slides and the adjustable spacer are of plastic material.

16. The coating thickness comparator of claim 8 wherein both poles of said first rod extend beyond said housing.

17. The coating thickness comparator of claim 9 wherein the poles of said first rod define a reference pole and a measuring pole, each of said poles extending beyond said housing means,
   a frictional force between both of said slides and said first and second rods corresponding to the coating thickness to be measured when both a standard ferromagnetic base is adjacent the reference poles and the coating thickness to be measured is adjacent the measuring pole.

18. The coating thickness comparator of claim 17 wherein said indicating means includes a scale provided on said housing parallel to said first and second rods and wherein said slides are arranged for movement both away from one another to first and second ends of the scale and toward one another.

19. A method for measuring a coating thickness comprising the steps of:
   contacting a surface of a coating to be measured with a first magnetic pole of a first rod;
   maintaining a second rod substantially parallel to said first rod with first and second spacers arranged for sliding movement along said first and second rods;
   magnetically attracting said second rod toward said first rod, the attraction of a first end of said second rod to said first magnetic pole of the first rod corresponding to the thickness of said coating to be measured;
   sliding said first and second spacers toward one another whereby the attraction between said first and second rods produces a friction between the first spacer and said rods corresponding to the thickness of said coating to be measured;
   measuring a position of said first and second spacers when adjacent one another relative to a mid-point of the first rod to indicate the thickness of the coating to be measured.

20. The method of claim 19 further comprising the steps of:
   simultaneously contacting a surface of a standard ferromagnetic base with a second magnetic pole of the first rod, said simultaneous contacting producing a friction between the second spacer and said rods corresponding to the attraction between the second magnetic pole and the standard ferromagnetic base.

21. The method of claim 19 further comprising the steps of:
   contacting a surface of a standard ferromagnetic base with the first magnetic pole of the first rod;
   magnetically attracting said second rod toward said first rod;
   sliding said first and second spacers toward one another until the first and second spacers coincide;
   measuring a position of said first and second spacers relative to a mid-point of the first rod;
   sliding said first and second spacers away from one another toward the poles of the first rod;
   separating the surface of the standard ferromagnetic base from the first magnetic pole of the first rod;
   comparing the measured position of the first and second spacers when the first pole contacts the surface of the standard ferromagnetic base with the measured position of the first and second spacers when the first pole contacts the coating to be measured.

* * * * *